United States Patent
Deguchi

(10) Patent No.: US 8,623,558 B2
(45) Date of Patent: Jan. 7, 2014

(54) NON-AQUEOUS ELECTROLYTE AND NON-AQUEOUS ELECTROLYTE SECONDARY BATTERY USING THE SAME

(75) Inventor: Masaki Deguchi, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/381,288

(22) PCT Filed: Mar. 15, 2011

(86) PCT No.: PCT/JP2011/001492
§ 371 (c)(1),
(2), (4) Date: Dec. 28, 2011

(87) PCT Pub. No.: WO2011/121912
PCT Pub. Date: Oct. 6, 2011

(65) Prior Publication Data
US 2012/0107700 A1    May 3, 2012

(30) Foreign Application Priority Data
Mar. 29, 2010 (JP) .................. 2010-075513

(51) Int. Cl.
*H01M 6/16* (2006.01)
(52) U.S. Cl.
USPC ........... 429/324; 429/328; 429/326; 429/330; 429/332; 429/341; 429/348
(58) Field of Classification Search
USPC .......... 429/330, 326, 332, 324, 328, 341, 348
See application file for complete search history.

(56) References Cited

U.S. PATENT DOCUMENTS

| 2002/0034678 A1 | 3/2002 | Shibuya et al. |
| 2002/0039677 A1* | 4/2002 | Iwamoto et al. ............ 429/122 |
| 2004/0106047 A1 | 6/2004 | Mie et al. |
| 2005/0095507 A1* | 5/2005 | Kim et al. .................... 429/331 |
| 2007/0015063 A1 | 1/2007 | Ogawa et al. |
| 2007/0172729 A1 | 7/2007 | Cho et al. |

FOREIGN PATENT DOCUMENTS

| JP | 11-031530 A | 2/1999 |
| JP | 2001-325988 A | 11/2001 |
| JP | 2003-132950 A | 5/2003 |
| JP | 2004-165151 A | 6/2004 |
| JP | 2004-355974 A | 12/2004 |
| JP | 2005-071749 A | 3/2005 |
| JP | 2009-524206 A | 6/2009 |

* cited by examiner

*Primary Examiner* — Patrick Ryan
*Assistant Examiner* — Alex Usyatinsky
(74) *Attorney, Agent, or Firm* — McDermott Will & Emery LLP

(57) ABSTRACT

A non-aqueous electrolyte in which the proportion of diethyl carbonate is reduced, and a nonaqueous electrolyte secondary battery using the same that has high safety are provided. The non-aqueous electrolyte of the invention for use in secondary batteries includes ethylene carbonate, propylene carbonate, diethyl carbonate, and an additive, as a non-aqueous solvent. The additive is at least one of a fluorinated aromatic compound having a molecular weight of 90 to 200 and a fatty acid alkyl ester having a molecular weight of 80 to 240. A weight ratio $W_{EC}$ ethylene carbonate, a weight ratio $W_{PC}$ of propylene carbonate, a weight ratio W DEC of diethyl carbonate, and a weight ratio $W_{LV}$ of the additive are 5 to 30 wt %, 15 to 60 wt %, 10 to 50 wt %, and 5 to 35 wt %, respectively, to the total of the non-aqueous electrolyte.

7 Claims, 1 Drawing Sheet

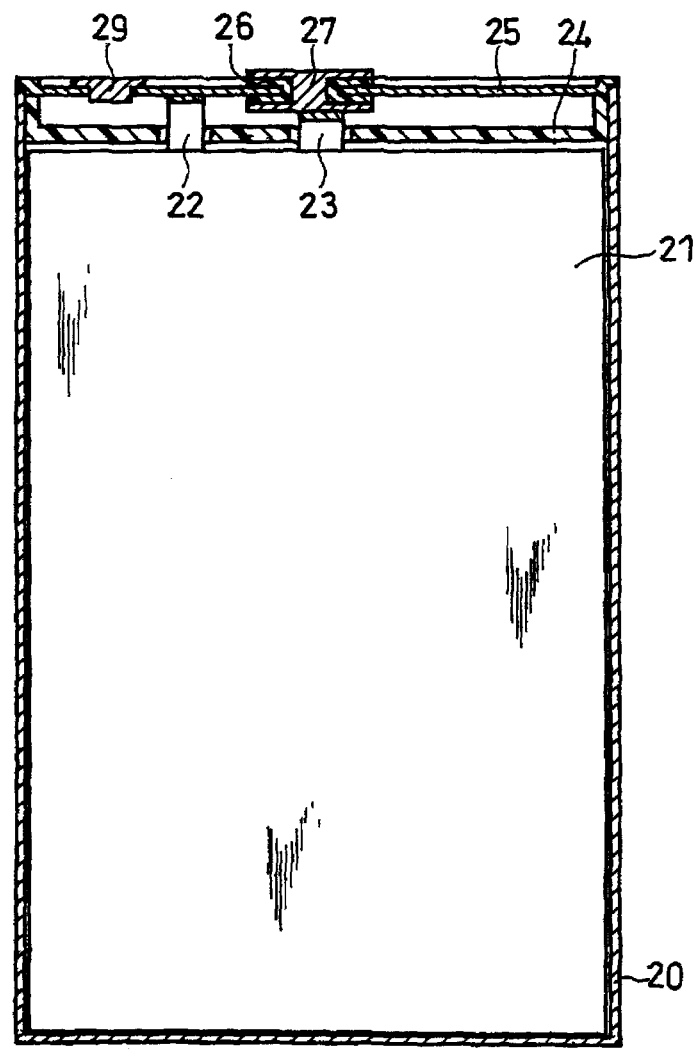

NON-AQUEOUS ELECTROLYTE AND NON-AQUEOUS ELECTROLYTE SECONDARY BATTERY USING THE SAME

RELATED APPLICATIONS

This application is the U.S. National Phase under 35 U.S.C. §371 of International Application No. PCT/JP2011/001492, filed on Mar. 15, 2011, which in turn claims the benefit of Japanese Application No. 2010-075513, filed on Mar. 29, 2010, the disclosures of which Applications are incorporated by reference herein.

TECHNICAL FIELD

The present invention relates to a non-aqueous electrolyte secondary battery, and particularly relates to improvement of a non-aqueous electrolyte thereof.

BACKGROUND ART

Secondary batteries that output high voltage, which are represented by lithium ion secondary batteries, include a non-aqueous electrolyte. The non-aqueous electrolyte includes a non-aqueous solvent and a solute dissolved in the non-aqueous solvent. As the solute, lithium hexafluorophosphate ($LiPF_6$), lithium tetrafluoroborate ($LiBF_4$) etc. are used.

The non-aqueous solvent includes a chain carbonate having low polarity but low viscosity, a cyclic carbonate having high polarity but relatively high viscosity, a cyclic carboxylic acid ester, a chain ether, cyclic ether etc. Examples of the chain carbonate include diethyl carbonate (DEC). Examples of the cyclic carbonate include ethylene carbonate (EC), propylene carbonate (PC), and vinylene carbonate (VC).

Various studies have been made on composition of the non-aqueous electrolyte.

Patent Literature 1 proposes a non-aqueous electrolyte including EC, PC, and DEC in a volume ratio of 1:2:7. When DEC having low viscosity is used as the main component, favorable low-temperature characteristics can be obtained.

Patent Literature 2 proposes a non-aqueous electrolyte including a fluorine-containing aromatic compound. By adding a fluorine-containing aromatic compound, deterioration of rate characteristics accompanying charge and discharge cycles can be suppressed.

CITATION LIST

Patent Literature

[PTL 1] Japanese Laid-Open Patent Publication No. 2004-355974
[PTL 2] Japanese Laid-Open Patent Publication No. 2003-132950

SUMMARY OF INVENTION

Technical Problem

Chain carbonates such as DEC are easily decomposed and cause easily gas production as compared with cyclic carbonates. Since the non-aqueous electrolyte described in Patent Literature 1 has a large proportion of DEC, a large amount of gas is produced along with decomposition of DEC during storage at high temperatures and during charge and discharge cycles. Thus, high-temperature storage characteristics and charge and discharge cycle characteristics of the battery are deteriorated readily. Since the non-aqueous electrolyte of Patent Literature 2 also uses DEC as the main solvent, a large amount of gas is produced along with decomposition of DEC during storage at high temperatures and during charge and discharge cycles.

Therefore, in view of suppressing gas production during storage at high temperatures and during charge and discharge cycles while ensuring favorable low-temperature characteristics, the present invention provides a non-aqueous electrolyte in which proportion of DEC is reduced, and a non-aqueous electrolyte secondary battery using the same that has high safety.

Solution to Problem

The present invention relates to a non-aqueous electrolyte including a non-aqueous solvent and a solute dissolved in the non-aqueous solvent,
the non-aqueous solvent including ethylene carbonate, propylene carbonate, diethyl carbonate, and an additive,
the additive being at least one of a fluorinated aromatic compound having a molecular weight of 90 to 200 and a fatty acid alkyl ester having a molecular weight of 80 to 240,
a weight ratio $W_{EC}$ of the ethylene carbonate being 5 to 30 wt % to the total of the non-aqueous electrolyte,
a weight ratio $W_{PC}$ of the propylene carbonate being 15 to 60 wt % to the total of the non-aqueous electrolyte,
a weight ratio $W_{DEC}$ of the diethyl carbonate being 10 to 50 wt % to the total of the non-aqueous electrolyte, and
a weight ratio $W_{LV}$ of the additive being 5 to 35 wt % to the total of the non-aqueous electrolyte.

Also, the present invention relates to a non-aqueous electrolyte secondary battery comprising a positive electrode, a negative electrode, a separator disposed between the positive electrode and the negative electrode, and the non-aqueous electrolyte described above.

Advantageous Effects of Invention

According to the present invention, it is possible to achieve, in a non-aqueous electrolyte secondary battery, high safety by suppressing gas production during storage at high temperatures and during charge and discharge cycles while ensuring favorable low-temperature characteristics.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A vertical sectional view schematically illustrating the configuration of a non-aqueous electrolyte secondary battery in accordance with an embodiment of the present invention.

DESCRIPTION OF EMBODIMENT

The non-aqueous electrolyte of the present invention includes a non-aqueous solvent and a solute dissolved in the non-aqueous solvent. The non-aqueous solvent includes a mixed solvent A of ethylene carbonate (EC), propylene carbonate (PC), and diethyl carbonate (DEC), and a low-viscosity solvent B which serves to adjust viscosity, as an additive.

A conventional non-aqueous electrolyte including DEC as the main solvent permits favorable low-temperature characteristics. However, since proportion of DEC included in the non-aqueous solvent is large, oxidative decomposition and reductive decomposition of DEC occur in the positive electrode and the negative electrode during storage at high temperatures and during charge and discharge cycles, and gases such as CO, $CO_2$, $CH_4$, and $C_2H_6$ may be produced greatly.

In order to solve the above problem, the present invention reduces relatively the proportion of DEC in the non-aqueous solvent, by adding cyclic carbonates of PC and EC which have high oxidation potential and which are difficult to be decomposed by oxidation, as compared with chain carbonates such as DEC.

Meanwhile, when the weight ratio of EC in the non-aqueous solvent including EC, PC, and DEC is relatively large, oxidative decomposition of EC occurs particularly in the positive electrode, and a large amount of gases such as CO and $CO_2$ is produced. Further, when the weight ratio of EC is excessively large, an excessive coating film is formed on the negative electrode, which lowers charge acceptance and facilitates deposition of Li.

Therefore, in the present invention a weight ratio $W_{PC}$ of PC to the total of the non-aqueous electrolyte is made relatively larger, being 15 to 60 wt %. By increasing relatively the weight ratio $W_{PC}$ of PC, oxidative decomposition and reductive decomposition of DEC, and oxidative decomposition of EC can be suppressed notably. The weight ratio $W_{PC}$ of PC is preferably 25 to 60 wt %, more preferably 30 to 50 wt %.

Further, since PC (melting point: −49° C.) has a lower melting point than EC (melting point: 37° C.), in one aspect, PC is advantageous in terms of the low-temperature characteristics of the non-aqueous electrolyte secondary battery. That is, by increasing relatively the weight ratio $W_{PC}$ of PC, the low-temperature characteristics of the non-aqueous electrolyte secondary battery can be improved while production of gases originating from DEC and EC can be suppressed favorably.

However, since the viscosity of PC is higher than the viscosities of EC and DEC, the viscosity of the non-aqueous electrolyte increases when the amount of PC increases.

When the non-aqueous electrolyte having a large amount of PC is used and charged in a low temperature environment, Li may be deposited on the negative electrode. When the battery in which Li is deposited on the surface of the negative electrode is stored in a high temperature environment, the defect of abnormal heat production in the battery may be caused because of the deposited Li.

Also, when the viscosity of the non-aqueous electrolyte increases, lithium-ion conductivity may decline at low temperatures, causing the defect of deterioration in the rate characteristics of the battery at low temperatures.

Therefore, the non-aqueous electrolyte of the present invention includes the low-viscosity solvent B as the additive that can solve the above defects. Consequently, production of gases originating from EC and DEC can be suppressed and the low-temperature characteristics of the non-aqueous electrolyte secondary battery can be improved, while also enabling suppression of defects which occur due to a large amount of PC can be suppressed.

In recent years, the safety standard required of non-aqueous electrolyte secondary batteries is extremely high. For example, there is a test in which a battery overcharged at a low temperature of about −5° C. is heated deliberately to about 130° C. By using the non-aqueous electrolyte of the present invention, high safety can be obtained in such a test.

The low-viscosity solvent B is a fluorinated aromatic compound (fluorine-containing aromatic compound) having a molecular weight of 90 to 200, or a fatty acid alkyl ester having a molecular weight of 80 to 240. These substances can be used singly or in combination of two or more. By using the low-viscosity solvent B, the viscosity of the non-aqueous electrolyte having a large amount of PC can be decreased notably. Thus, the rate characteristics at low temperatures can be improved. Also, deposition of Li on the negative electrode surface caused during the charge at low temperatures can be suppressed.

The low-viscosity solvent B is a solvent having a viscosity (25° C.) of 1 mPa·s or less. The viscosity (25° C.) of the fluorinated aromatic compound having a molecular weight of 90 to 200 is 0.3 to 1 mPa·s. The viscosity (25° C.) of the fatty acid alkyl ester having a molecular weight of 80 to 240 is 0.3 to 1 mPa·s.

By setting the molecular weight of the fluorinated aromatic compound to 200 or less (viscosity of 1 mPa·s or less), the viscosity of the non-aqueous electrolyte can be reduced sufficiently. By setting the molecular weight of the fluorinated aromatic compound to 90 or more (viscosity of 0.3 mPa·s or more), the fluorinated aromatic compound cannot be decomposed easily, which ensures sufficiently the stability of the non-aqueous electrolyte.

By setting the molecular weight of the fatty acid alky ester to 240 or less (viscosity of 1 mPa·s or less), the viscosity of the non-aqueous electrolyte can be reduced sufficiently. By setting the molecular weight of the fatty acid alkyl ester to 80 or more (viscosity of 0.3 mPa·s or more), the fatty acid alkyl ester cannot be decomposed easily, which ensures sufficiently the stability of the non-aqueous electrolyte.

The viscosity of the non-aqueous electrolyte (25° C.) is preferably 3 to 7 mPa·s. Thus, deterioration of the rate characteristics at low temperatures can be suppressed. Also, deposition of Li during the charge in a low temperature environment can be suppressed. The viscosity is measured by using a rotational viscometer, and a spindle of a cone-plate type.

The fluorinated aromatic compound and fatty acid alkyl aster described above are considered to form compounds that are stable with Li. Therefore, even when Li is deposited on the negative electrode surface due to overcharge in a low temperature environment, abnormal heat production in the battery in a high temperature environment can be suppressed. That is, by using the low-viscosity solvent B, deposition of Li can be suppressed; furthermore, even when Li is deposited, abnormal heat production in the battery hardly occurs and the safety of the battery is improved.

A weight ratio $W_{LV}$ of the low-viscosity solvent B is 5 to 35 wt % to the total of the non-aqueous electrolyte. By setting the weight ratio of the low-viscosity solvent B to 5 wt % or more, the effect of adding the low-viscosity solvent B can be obtained sufficiently. By setting the weight ratio of the low-viscosity solvent B to 35 wt % or less, reduction in the effect of the mixed solvent A of EC, PC, and DEC due to excessive decrease in the weight ratio of the mixed solvent A, is suppressed. The weight ratio $W_{LV}$ of the low-viscosity solvent B is preferably 15 to 35 wt % to the total of the non-aqueous electrolyte.

The fluorinated aromatic compound having a molecular weight of 90 to 200 is preferably a compound represented by the following formula (1).

[Chem. 1]

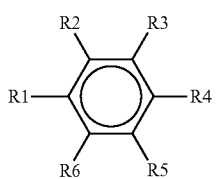

(1)

In the formula (1), $R^1$ to $R^6$ are independently a hydrogen atom, a fluorine atom, or a methyl group, and at least one of the $R^1$ to $R^6$ is a fluorine atom.

The fluorinated aromatic compound having a molecular weight of 90 to 200 is preferably fluorobenzene, 1,2-difluorobenzene, 1,2,3-trifluorobenzene, 1,2,3,4-tetrafluorobenzene, pentafluorobenzene, hexafluorobenzene, 2-fluorotoluene, or trifluorotoluene. These compounds can be used singly or in combination of two or more. Among these compounds, fluorobenzene is particularly preferable because the respective effects of decrease in viscosity of the non-aqueous electrolyte and of improved heat stability during the charge at low temperatures, can be obtained remarkably.

The fatty acid alky ester having a molecular weight of 80 to 240 is preferably a compound represented by the following formula (2).

[Chem. 2]

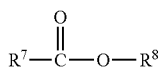

(2)

In the formula (2), $R^7$ and $R^8$ are independently an alkyl group having 1 to 5 carbons. The alkyl group has preferably 1 to 4 carbons because the viscosity of the non-aqueous electrolyte can be reduced sufficiently.

The fatty acid alkyl ester having a molecular weight of 80 to 240 is preferably ethyl acetate, propyl acetate, butyl acetate, pentyl acetate, isopentyl acetate, methyl propionate, ethyl propionate, propyl propionate, butyl propionate, pentyl propionate, methyl butyrate, ethyl butyrate, propyl butyrate, butyl butyrate, pentyl butyrate, methyl pentanoate, ethyl pentanoate, propyl pentanoate, butyl pentanoate, pentyl pentanoate, methyl hexanoate, ethyl hexanoate, propyl hexanoate, butyl hexanoate, or pentyl hexanoate. These compounds can be used singly or in combination of two or more.

Among these compounds, ethyl propionate, methyl butyrate, ethyl butyrate, methyl pentanoate, or ethyl pentanoate is particularly preferable because the effect of improved low-temperature rate characteristics can be obtained notably.

It is preferable to use both the fluorinated aromatic compound and the fatty acid alkyl ester because the effect improved heat stability can be obtained notably with the fluorinated aromatic compound, and the effect of improved low-temperature rate characteristics can be obtained with the fatty acid alkyl ester.

When the low-viscosity solvent B includes both the fluorinated aromatic compound and the fatty acid alkyl ester, a weight ratio $W_{F4}$ of the fluorinated aromatic compound is preferably 5 to 15 wt % to the total of the non-aqueous electrolyte, and a weight ratio $W_{ES}$ of the fatty acid alkyl ester is preferably 5 to 25 wt % to the total of the non-aqueous electrolyte.

In order to obtain the effect of the fluorinated aromatic compound and the effect of the fatty acid alkyl ester in good balance, a ratio $W_{F4}/W_{ES}$: the weight ratio $W_{F4}$ of the fluorinated aromatic compound to the weight ratio $W_{ES}$ of the fatty acid alkyl ester, is preferably 0.2 to 1.

A weight ratio $W_{EC}$ of EC is 5 to 30 wt %, preferably 5 to 20 wt % to the total of the non-aqueous electrolyte. In this case, production of gas originating from oxidative decomposition of EC reduces and an appropriate coating film is formed on the negative electrode, which improves greatly the charge and discharge capacity and the rate characteristics of the non-aqueous electrolyte secondary battery. By setting the weight ratio of EC to 5 wt % or more, a coating film (SEI: solid electrolyte interface) can be formed sufficiently on the negative electrode, which allows lithium ions to be absorbed easily in the negative electrode or desorbed easily from the negative electrode. By setting the weight ratio of EC to 30 wt % or less, oxidative decomposition of EC particularly on the positive electrode can be suppressed, and the production of gas due to such oxidative decomposition can be reduced. Also, by setting the weight ratio of EC to 30 wt % or less, decline in the charge acceptance and deposition of Li due to excessive formation of a coating film on the negative electrode can be suppressed.

In view of the charge and discharge capacity and the rate characteristics of the non-aqueous electrode secondary battery, the weight ratio $W_{EC}$ of EC is particularly preferably 10 to 15 wt % to the total of the non-aqueous electrolyte.

A weight ratio $W_{DEC}$ of DEC is 10 to 50 wt % to the total of the non-aqueous electrolyte. By setting the weight ratio of DEC to 10 wt % or more, favorable discharge characteristics at low temperatures can be obtained. By setting the weight ratio of DEC to 50 wt % or less, gas production can be reduced. In order to improve greatly the low-temperature characteristics of the non-aqueous electrolyte secondary battery, the weight ratio $W_{DEC}$ of DEC is preferably 10 to 40 wt % to the total of the non-aqueous electrolyte. In view of the cycle characteristics and the low-temperature characteristics of the non-aqueous electrolyte secondary battery, the weight ratio $W_{DEC}$ of DEC is more preferably 30 to 40 wt % to the total of the non-aqueous electrolyte.

A ratio $W_{PC}/W_{EC}$: the weight ratio $W_{PC}$ of PC to the weight ratio $W_{EC}$ of EC in the total of the non-aqueous electrolyte, is preferably 2.25 to 6. By setting the $W_{PC}/W_{EC}$ to 2.25 or more, production of gas originating from oxidative decomposition of EC particularly in the positive electrode can be reduced. Meanwhile, by setting the $W_{PC}/W_{EC}$ to 6 or less, production of gas originating from reductive decomposition of PC particularly in the negative electrode can be reduced. The ratio $W_{PC}/W_{EC}$: the weight ratio $W_{PC}$ of PC to the weight ratio $W_{EC}$ of EC is preferably 3 to 5.

The weight ratio of EC, PC, and DEC is preferably $W_{EC}:W_{PC}:W_{DEC}=1:3$ to $6:1$ to $4$, more preferably $1:3$ to $5:1$ to $4$. By adding the low-viscosity solvent B, it is possible to reduce the weight ratio of DEC to $W_{EC}:W_{PC}:W_{DEC}=1:5:1$.

In the non-aqueous electrolyte having the weight ratio of EC, PC, and DEC in the above range, the weight ratio of PC is large, and the weight ratio of EC and DEC is relatively small. Consequently, production of gas originating from oxidative reaction and reductive reaction of EC and DEC can be reduced to a very small amount.

It is preferable that the non-aqueous electrolyte includes, as an additive C, at least one of a sultone compound and a cyclic carbonate having a C=C unsaturated bond, in addition to the fluorinated aromatic compound and the fatty acid alkyl ester described above.

The amount of the additive C, that is, the total amount of the sultone compound and the cyclic carbonate having a C=C unsaturated bond preferably accounts for 1.5 to 5 wt %, more preferably 2 to 4 wt %, of the total of the non-aqueous electrolyte. By setting the total amount of the sultone compound and the cyclic carbonate having a C=C unsaturated bond to 1.5 wt % or more to the total of the non-aqueous electrolyte, the effect of suppressing reductive decomposition of PC can be obtained sufficiently in the non-aqueous electrolyte including EC, PC, and DEC. By setting the total amount of the sultone compound and the cyclic carbonate having a C=C unsaturated bond to 5 wt % or less to the total of the non-aqueous electrolyte, a coating film is formed appropriately on the negative electrode surface, and absorption reaction and desorption reaction of lithium ions occur smoothly, enabling excellent charge acceptance in the non-aqueous electrolyte including EC, PC, and DEC.

A ratio $W_C/W_{SL}$: the weight ratio $W_C$ of the cyclic carbonate having a C=C unsaturated bond to the weight ratio of the sultone compound, is preferably 0.75 to 3. By setting the $W_C/W_{SL}$ to 0.75 or more, the charge acceptance is improved and excellent cycle characteristics can be obtained. Also, the coating film resistance of the negative electrode can be reduced and the discharge characteristics at low temperatures can be improved. Meanwhile, by setting the $W_C/W_{SL}$ to 3 or less, increase in the gas production caused by oxidative decomposition of the cyclic carbonate having a C=C unsaturated bond due to excessive amount thereof, can be suppressed. The $W_C/W_{SL}$ is more preferably 0.75 to 2, particularly preferably 1 to 1.5.

Since the additive C includes the cyclic carbonate having a C=C unsaturated bond, a coating film is formed mainly on the negative electrode, which suppresses decomposition of the non-aqueous electrolyte.

Specific examples of the cyclic carbonate having a C=C unsaturated bond include vinylene carbonate (VC), vinyl ethylene carbonate (VEC), and divinyl ethylene carbonate (DVEC). These compounds can be used singly or in combination of two or more. Among these compounds, the additive C preferably includes vinylene carbonate, in terms of being able to form a thin and fine coating film on the negative electrode, and of low coating film resistance.

Since the additive C includes the sultone compound, coating films are formed respectively on the positive electrode and the negative electrode. Since a coating film is formed on the positive electrode, oxidative decomposition of the non-aqueous solvent on the positive electrode in a high temperature environment can be suppressed. Also, since a coating film is formed on the negative electrode, reductive decomposition of the non-aqueous solvent, particularly PC, in the negative electrode can be reduced.

Specific examples of the sultone compound include 1,3-propane sultone (PS), 1,4-butane sultone, and 1,3-pronene sultone (PRS). These compounds can be used singly or in combination of two or more. Among these compounds, the additive C preferably includes 1,3-propane sultone, in terms of a higher effect of suppressing reductive decomposition of PC.

Above all, it is particularly preferable that the additive C includes both of vinylene carbonate and 1,3-propane sultone. In this case, a coating film originating from 1,3-propane sultone is formed on the positive electrode, and a coating film originating from vinylene carbonate and a coating film originating from 1,3-propane sultone are formed on the negative electrode. Since the coating film originating from vinylene carbonate can suppress increase in the coating film resistance, the charge acceptance can be improved. Consequently, deterioration in the cycle characteristics can be suppressed. The coating film originating from 1,3-propane sultone can suppress reductive decomposition of PC and can suppress generation of gases such as $CH_4$, $C_3H_6$, and $C_3H_8$.

When only vinylene carbonate is added, since vinylene carbonate has poor oxidation resistance, it is decomposed by oxidation in the positive electrode and a large amount of $CO_2$ gas may be produced. By adding 1,3-propane sultone together with vinylene carbonate, 1,3-propane sultone forms a coating film also on the positive electrode surface, and oxidative decomposition of vinylene carbonate can also be suppressed as well as oxidative decomposition of non-aqueous solvent. Consequently, production of gas such as $CO_2$ can be suppressed greatly.

The additive C is not limited to the sultone compound and the cyclic carbonate having a C=C unsaturated bond described above and can include other compounds. Other compounds are not particularly limited, and examples thereof include cyclic sulfone such as sulfolane, fluorine-containing compound such as fluorinated ether, and cyclic carboxylic acid ester such as γ-butyrolactone. The weight ratio of these other additives is preferably 10 wt % or less to the total of the non-aqueous electrolyte. These other additives may be used singly or in combination of two or more.

The solute of the non-aqueous electrolyte is not particularly limited. Examples thereof include inorganic lithium salts such as $LiPF_6$ and $LiBF_4$, and lithium imide compounds such as $LiN(CF_2SO_2)_2$ and $LiN(C_2F_5SO_2)_2$. The solute in the non-aqueous electrolyte preferably has a concentration of 1 to 1.5 mol/L, more preferably being 1 to 1.2 mol/L.

The non-aqueous electrolyte secondary battery of the present invention includes a positive electrode, a negative electrode, a separator disposed between the positive electrode and the negative electrode, and the non-aqueous electrolyte described above. Since the above non-aqueous electrolyte has excellent lithium conductivity, the rate characteristics of the battery can be improved. Even when Li is deposited on the negative electrode surface, abnormal increase in the battery temperature due to Li deposited on the negative electrode surface can be suppressed during storage at high temperatures, which improves the safety of the battery.

The method of producing the battery described above includes, for example, the steps of:

(1) forming an electrode group including the positive electrode, the negative electrode, and the separator;

(2) injecting the non-aqueous electrolyte into a battery case after the electrode group is housed in the battery case;

(3) sealing the battery case after the step (2); and (4) performing one or more times, preparatory charge and discharge after the step (3).

The positive electrode is not particularly limited as long as it can be used as the positive electrode of the non-aqueous electrolyte secondary battery. The positive electrode can be obtained, for example, by applying a positive electrode material mixture slurry including a positive electrode active material, a conductive agent such as carbon black, and a binder such as polyvinylidene fluoride, onto a positive electrode core material such as aluminum foil, and drying and rolling the same. As the positive electrode active material, a lithium-containing transition metal composite oxide is preferable. Typical examples of the lithium-containing transition metal composite oxide include $LiCoO_2$, $LiNiO_2$, $LiMn_2O_4$, and $LiMnO_2$.

In particular, the positive electrode preferably includes a composite oxide including lithium and nickel, in terms of being able to achieve more notably, the effect of suppressing gas production while also ensuring high capacity. In this case, the molar ratio of nickel to lithium included in the composite oxide is 30 to 100 mol %.

The composite oxide preferably includes at least one selected from the group consisting of manganese and cobalt, and the molar ratio of the total of manganese and cobalt to lithium is preferably 70 mol % or less.

The composite oxide including lithium and nickel is represented, for example, by the general formula:

$$Li_xNi_yM_zMe_{1-(y+z)}O_{2+d},$$

where: M is at least one element selected from the group consisting of Co and Mn; Me is at least one element selected from the group consisting of Al, Cr, Fe, Mg, and Zn; $0.98 \leq x \leq 1.1$; $0.3 \leq y \leq 1$; $0 \leq z \leq 0.7$; $0.9 \leq y+z \leq 1$; and $-0.01 \leq d \leq 0.01$.

The negative electrode is not particularly limited as long as it can be used as the negative electrode of the non-aqueous electrolyte secondary battery. The negative electrode can be obtained by applying a negative electrode material mixture slurry including a negative electrode active material, a binder such as styrene-butadiene rubber (SBR), and a thickener such as carboxymethyl cellulose (CMC), onto a negative electrode core material such as copper foil, and drying and rolling the same. As the negative electrode active material, carbon material such as natural graphite and artificial graphite is preferable.

As the separator, a microporous film such as polyethylene and polypropylene is generally used. The separator has a thickness of 10 to 30 μm, for example.

The present invention is applicable to non-aqueous electrolyte secondary batteries of various shapes such as cylindrical, flat, coin-type, prismatic etc., and the shape of the batteries is not particularly limited.

EXAMPLES

Next, the present invention will be described specifically with reference to examples and comparative examples. However, the present invention is not limited to the following examples.

Example 1

(1) Production of Negative Electrode

Carboxymethyl cellulose (hereinafter CMC; molecular weight: 400,000), which is a water-soluble polymer, was dissolved in water to obtain an aqueous solution having a CMC concentration of 1 wt %. One hundred parts by weight of natural graphite particles (average particle diameter: 20 μm) and 100 parts by weight of an aqueous CMC solution were mixed and stirred while the temperature of the mixture was controlled at 25° C. Subsequently, the mixture was dried at 150° C. for 5 hours to obtain a dry mixture. In the dry mixture, the amount of CMC was 1 part by weight to 100 parts by weight of the graphite particles.

One hundred parts by weight of the dry mixture, 0.6 parts by weight of a binder (hereinafter SBR) which was a powder having an average particle diameter of 0.12 μm including a styrene unit and a butadiene unit and having rubber elasticity, 0.9 parts by weight of carboxymethyl cellulose, and an appropriate amount of water were mixed to prepare a negative electrode material mixture slurry. SBR was mixed with the other components in the state of emulsion having water as a dispersion medium (BM-400B (product name) available from Zeon Corporation; weight ratio of SBR: 40 wt %).

The obtained negative electrode material mixture slurry was applied onto both surfaces of electrolytic copper foil (thickness: 12 μm) as a negative electrode core material by using a die coater, and the resultant coatings were dried at 120° C. Subsequently, the dried coatings were rolled by rollers with a linear pressure of 0.25 ton/cm to form negative electrode material mixture layers each having a thickness of 160 μm and a graphite density of 1.65 g/cm³. The negative electrode material mixture layers were each cut into a predetermined shape, together with the negative electrode core material, to obtain a negative electrode.

(2) Production of Positive Electrode

Four parts by weight of polyvinylidene fluoride (PVDF) as a binder and 8 parts by weight of acetylene black as a conductive agent were added to 100 parts by weight of $LiNi_{0.80}Cu_{0.15}Al_{0.05}O_2$ as a positive electrode active material, which was then mixed with an appropriate amount of N-methyl-2-pyrrolidone (NMP) to prepare a positive electrode material mixture slurry. The obtained positive electrode material mixture slurry was applied onto both surfaces of aluminum foil having a thickness of 20 μm as a positive electrode core material, and the resultant coatings were dried and then rolled to form positive electrode material mixture layers. The positive electrode material mixture layers were each cut into a predetermined shape, together with the positive electrode core material, thereby obtaining a positive electrode.

(3) Preparation of Non-Aqueous Electrolyte $LiPF_6$ was dissolved in a non-aqueous solvent prepared by adding fluorobenzene (FB) as a low-viscosity solvent B to a mixed solvent A of ethylene carbonate (EC), propylene carbonate (PC), and diethyl carbonate (DEC), thereby to prepare a non-aqueous electrolyte. Two wt % of vinylene carbonate (VC) and 1 wt % of 1,3-propane sultone were included in the non-aqueous electrolyte. $LiPF_6$ concentration of the non-aqueous electrolyte was set to 1 mol/L.

(4) Assembly of Battery

A prismatic lithium ion secondary battery as illustrated in FIG. 1 was produced.

The negative electrode and the positive electrode were wound with a separator interposed therebetween to form an electrode group 21 having a cross section of a substantially oval shape. As the separator, a microporous film (A089 (product name) available from Celgard, Co. Ltd.) made of polyethylene having a thickness of 20 μm was used. The electrode group 21 was housed in a battery can 20 of a prismatic shape and made of aluminum. The battery can 20 had a bottom portion, side walls, and an upper portion being an opening, and had a substantially rectangular shape. The thickness of main flat portions of the side walls was set to 80 μm. Subsequently, an insulator 24 for preventing contact of a positive lead 22 and a negative lead 23 with the battery can 20 was arranged on the upper portion of the electrode group 21. A sealing plate 25 of a rectangular shape having in the center thereof, a negative terminal 27 surrounded by an insulating gasket 26, was arranged on the opening of the battery can 20. The negative lead 23 was connected to the negative terminal 27. The positive lead 22 was connected to the lower surface of the sealing plate 25. The edge of the opening of the battery can 20 was laser welded to the sealing plate 25, thereby to seal the opening of the battery can 20. Subsequently, 2.5 g of the non-aqueous electrolyte was injected into the battery can 20 from an injection hole of the sealing plate 25. Finally, the injection hole was closed with a sealing plug 29 by welding, thereby to complete a prismatic lithium ion secondary battery having a height of 50 mm, a width of 34 mm, a thickness of an inner space of about 5.2 mm, and a design capacity of 850 mAh.

At the time of producing the above battery, a weight ratio $W_{FA}$ of the fluorinated aromatic compound to the total of the non-aqueous electrolyte was changed to the values as listed in Table 1. The mixing weight ratio of EC, PC, and DEC of the non-aqueous solvent, with the exclusion of FB, was set to 1:5:4. Thus, batteries 1 to 7 were obtained. The batteries 1, 2, and 7 are comparative examples.

Also, the viscosity of each of the non-aqueous electrolytes at 25° C. was measured by a rotational viscometer (cone-plate type; radius of cone-plate: 24 mm). The measurement results are shown in Table 2.

TABLE 1

| Battery No. | Amount of fluorinated aromatic compound $W_{FA}$ (wt %) |
|---|---|
| 1 (comparative) | 0 |
| 2 (comparative) | 1 |
| 3 | 5 |
| 4 | 10 |
| 5 | 20 |
| 6 | 35 |
| 7 (comparative) | 40 |

The following evaluations were made for each of the batteries.

[Evaluations]

(1) Evaluation of Cycle Characteristics

For each battery, the following charge and discharge cycle test was performed in an environment at 45° C.

Each battery was charged at a constant current of 600 mA until the battery voltage reached 4.2 V, and subsequently charged at a constant voltage of 4.2 V. The charge time totaling the constant current charge and the constant voltage charge was set to 2 hours and 30 minutes. The rest time after the charge was set to 10 minutes. Thereafter, the battery was discharged at a constant current of 850 mA until the battery voltage reached 2.5 V. The rest time after the discharge was set to 10 minutes.

The above charge and discharge were repeated. Regarding the discharge capacity at the $3^{rd}$ cycle as 100%, the discharge capacity at the $500^{th}$ cycle was expressed in percentage, and this was designated as the cycle capacity retention rate (%).

(2) Evaluation of Battery Expansion

For each battery, after the charge at the $3^{rd}$ cycle and after the $501^{st}$ cycle in the charge and discharge cycle test described in (1) above, the thickness of the central portion perpendicular to the maximum plane surface (length: 50 mm, width: 34 mm) of the battery was measured. From the difference of the battery thicknesses, battery expansion (mm) during the charge and discharge cycles in an environment at 45° C. was determined.

(3) Evaluation of Low-Temperature Discharge Characteristics

For each battery, 3 cycles of charge and discharge were performed in an environment at 25° C. under the same conditions as in (1) above. Next, after the charge at the $4^{th}$ cycle was performed in an environment at 25° C., the battery was left for 3 hours in an environment at 0° C., and then discharged in the same environment at 0° C. Regarding the discharge capacity at the $3^{rd}$ cycle (25° C.) as 100%, the discharge capacity at the $4^{th}$ cycle (0° C.) was expressed in percentage, and this was designated as the low-temperature discharge capacity retention rate (%). The charge and discharge conditions at the $4^{th}$ cycle were set to the same conditions as in (1) above, with the exception of: the rest time after the charge; the ambient temperature during the rest time after the charge; and the ambient temperature during the discharge.

(4) Evaluation of Safety of Battery

For each battery, 3 cycles of charge and discharge were performed in an environment at 25° C. under the same conditions as in (1) above.

Next, the charge at the $4^{th}$ cycle was performed under the following conditions. The battery was charged at a constant current of 600 mA in an environment at −5° C. until the battery voltage reached 4.25 V, and subsequently charged at a constant voltage of 4.25 V. The charge time totaling the constant current charge and the constant voltage charge was set to 2 hours and 30 minutes.

Thereafter, the battery temperature was increased to 130° C. at 5° C./min and was subsequently retained at 130° C. for 3 hours. Then, the temperature of the battery surface was measured with a thermocouple, and the maximum value thereof was determined.

Evaluation results are shown in Table 2.

TABLE 2

| Battery No. | Amount of fluorinated aromatic compound $W_{FA}$ (wt %) | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (° C.) |
|---|---|---|---|---|---|---|
| 1 (comparative) | 0 | 5.2 | 84.2 | 0.41 | 74.2 | 170 |
| 2 (comparative) | 1 | 5.1 | 84.3 | 0.40 | 74.3 | 158 |
| 3 | 5 | 4.9 | 84.5 | 0.38 | 75.0 | 133 |
| 4 | 10 | 4.7 | 85.0 | 0.35 | 76.1 | 131 |
| 5 | 20 | 4.3 | 82.9 | 0.41 | 73.7 | 131 |
| 6 | 35 | 3.9 | 81.2 | 0.55 | 70.5 | 131 |
| 7 (comparative) | 40 | 3.5 | 71.8 | 1.03 | 59.8 | 131 |

The batteries 3 to 6 had excellent cycle characteristics, low-temperature characteristics, and safety.

In the present example, the mixing weight ratio of EC, PC, and DEC was set to 1:5:4. Even with other mixing weight ratios, the above-described effect of the present invention can be obtained, as long as the weight ratios of EC, PC, and DEC to the total of the non-aqueous electrolyte are 5 to 30 wt %, 15 to 60 wt %, and 10 to 50 wt %, respectively.

Example 2

When producing the above non-aqueous electrolyte, a weight ratio $W_{EC}$ of EC to the total of the non-aqueous electrolyte was changed to values as listed in Table 3. The mixing weight ratio of PC, DEC, and FB of the non-aqueous solvent, with the exclusion of EC, was set to 5:4:1.

Except for above, batteries 11 to 18 were produced in the same manner as in Example 1 and evaluated. The batteries 11, 12, and 18 are comparative examples.

Evaluation results are shown in Table 3.

TABLE 3

| Battery No. | EC amount $W_{EC}$ (wt %) | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (° C.) |
|---|---|---|---|---|---|---|
| 11 (comparative) | 0 | 4.3 | | | Not chargeable | |
| 12 (comparative) | 1 | 4.4 | | | Not chargeable | |
| 13 | 5 | 4.6 | 80.2 | 0.58 | 75.0 | 135 |
| 14 | 10 | 4.8 | 85.0 | 0.35 | 76.1 | 132 |
| 15 | 15 | 4.9 | 85.0 | 0.36 | 76.0 | 131 |
| 15 | 20 | 5.3 | 84.5 | 0.39 | 75.4 | 131 |
| 17 | 30 | 5.6 | 81.7 | 0.51 | 73.6 | 132 |
| 18 (comparative) | 40 | 6.0 | 46.9 | 1.33 | 55.0 | 133 |

The batteries 13 to 17 had excellent cycle characteristics, low-temperature characteristics, and safety.

In this example, the mixing weight ratio of PC, DEC, and FB was set to 5:4:1. Even with other mixing weight ratios, the above-described effect of the present invention can be obtained, as long as the weight ratios of PC, DEC, and FB to the total of the non-aqueous electrolyte are 15 to 60 wt %, 10 to 50 wt %, and 5 to 35 wt %, respectively.

In the batteries 11 and 12 having excessively small EC amount, a coating film (SEI) was not sufficiently formed on the negative electrode, which made the negative electrode difficult to absorb and desorb lithium ions. For this reason, the charge and discharge could not be performed under predetermined conditions.

Example 3

When producing the above non-aqueous electrolyte, a weight ratio $W_{PC}$ of PC to the total of the non-aqueous electrolyte was changed to values as listed in Table 4. The mixing weight ratio of EC, DEC, and FB of the non-aqueous electrolyte, with the exclusion of PC, was set to 1:3:1.

Except for above, batteries 21 to 29 were produced in the same manner as in Example 1 and evaluated. The batteries 21, 22, and 29 are comparative examples.

Evaluation results are shown in Table 4.

The batteries 23 to 28 had excellent cycle characteristics, low-temperature characteristics, and safety.

In this example, the mixing weight ratio of EC, DEC, and FB was set to 1:3:1. Even with other mixing weight ratios, the above-described effect of the present invention can be obtained, as long as the weight ratios of EC, DEC, and FB to the total of the non-aqueous electrolyte are 5 to 30 wt %, 10 to 50 wt %, or 5 to 35 wt %, respectively.

Example 4

When producing the above non-aqueous electrolyte, a weight ratio $W_{DEC}$ of DEC to the total of the non-aqueous electrolyte was changed to values as listed in Table 5. The mixing weight ratio of EC, PC, and FB of the non-aqueous solvent, with the exclusion of DEC, was set to 1:3:1.

Except for above, batteries 31 to 37 were produced and evaluated. The batteries 31, 32, and 37 are comparative examples.

Evaluation results are shown in Table 5.

TABLE 4

| Battery No. | PC amount $W_{PC}$ (wt %) | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (° C.) |
|---|---|---|---|---|---|---|
| 21 (comparative) | 0 | 3.6 | 66.0 | 1.07 | 77.6 | 131 |
| 22 (comparative) | 10 | 3.8 | 71.5 | 0.89 | 77.3 | 131 |
| 23 | 15 | 4.2 | 82.0 | 0.46 | 77.0 | 131 |
| 24 | 25 | 4.6 | 83.8 | 0.41 | 76.7 | 131 |
| 25 | 30 | 4.8 | 84.4 | 0.38 | 76.5 | 131 |
| 26 | 45 | 5.5 | 85.1 | 0.34 | 76.1 | 132 |
| 27 | 50 | 5.9 | 84.2 | 0.39 | 74.9 | 132 |
| 28 | 60 | 6.3 | 81.3 | 0.59 | 71.7 | 132 |
| 29 (comparative) | 65 | 6.8 | 62.8 | 1.10 | 65.0 | 135 |

TABLE 5

| Battery No. | DEC amount $W_{DEC}$ (wt %) | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (°C.) |
|---|---|---|---|---|---|---|
| 31 (comparative) | 0 | 8.5 | 61.1 | 1.15 | 52.2 | 132 |
| 32 (comparative) | 5 | 7.8 | 70.8 | 1.01 | 67.8 | 132 |
| 33 | 10 | 6.9 | 80.5 | 0.57 | 71.0 | 132 |
| 34 | 30 | 5.8 | 82.4 | 0.44 | 73.9 | 132 |
| 35 | 40 | 4.9 | 84.6 | 0.36 | 75.7 | 132 |
| 36 | 50 | 4.1 | 81.0 | 0.55 | 78.4 | 132 |
| 37 (comparative) | 55 | 3.7 | 73.9 | 0.92 | 79.3 | 135 |

The batteries 33 to 36 had excellent cycle characteristics, low-temperature characteristics, and safety.

In this example, the mixing weight ratio of EC, PC, and FB was set to 1:3:1. Even with other mixing ratios, the above-described effect of the present invention can be obtained, as long as the weight ratios of EC, PC, and FB to the total of the non-aqueous electrolyte are 5 to 30 wt %, 15 to 60 wt %, and 5 to 35 wt %, respectively.

Example 5

As the non-aqueous solvent, a mixed solvent of EC, PC, and DEC, to which the fluorinated aromatic compound and the fatty acid alkyl ester were added as the low-viscosity solvent B, was used. As the fluorinated aromatic compound, fluorobenzene (FB) was used. As the fatty acid alkyl ester, ethyl propionate (EP) was used. The weight ratio $W_{FA}$ of the fluorinated aromatic compound to the total of the non-aqueous electrolyte and the weight ratio $W_{ES}$ of the fatty acid alkyl ester to the total of the non-aqueous electrolyte were changed to values as listed in Table 6. The mixing weight ratio of EC, PC, and DEC was set to 1:5:4.

Except for above, batteries 41 to 50 were produced in the same manner as in Example 1 and evaluated.

Evaluation results are shown in Table 6.

TABLE 6

| Battery No. | Amount of fluorinated aromatic compound $W_{FA}$ (wt %) | Amount of fatty acid alkyl ester $W_{ES}$ (wt %) | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (°C.) |
|---|---|---|---|---|---|---|---|
| 41 | 1 | 10 | 4.7 | 83.6 | 0.45 | 76.0 | 135 |
| 42 | 5 | 10 | 4.2 | 85.7 | 0.32 | 79.0 | 132 |
| 43 | 10 | 10 | 3.9 | 86.0 | 0.30 | 81.1 | 131 |
| 44 | 15 | 10 | 3.6 | 84.7 | 0.40 | 78.3 | 130 |
| 45 | 20 | 10 | 3.1 | 84.0 | 0.35 | 75.6 | 130 |
| 46 | 5 | 1 | 4.8 | 84.6 | 0.37 | 75.2 | 133 |
| 47 | 5 | 5 | 4.5 | 85.3 | 0.35 | 77.1 | 132 |
| 48 | 5 | 10 | 4.2 | 85.7 | 0.32 | 79.0 | 132 |
| 49 | 5 | 20 | 3.7 | 84.5 | 0.38 | 83.2 | 132 |
| 50 | 5 | 25 | 3.3 | 84.0 | 0.42 | 85.6 | 133 |

All of the batteries had favorable cycle characteristics, low-temperature characteristics, and safety. In particular, the batteries 42 to 44 and the batteries 47 to 50, each having an FB amount of 5 to 15 wt % and an EP amount of 5 to 25 wt %, had excellent characteristics.

Example 6

By using the fluorinated aromatic compound as shown in Table 7 in place of FB as the low-viscosity solvent B, the weight ratio of the low-viscosity solvent B was set to 10 wt % to the total of the non-aqueous electrolyte.

Except for above, batteries were produced in the same manner as in Example 1 and evaluated.

Evaluation results are shown in Table 7.

TABLE 7

| Battery No. | Type of fluorinated aromatic compound | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (°C.) |
|---|---|---|---|---|---|---|
| 51 | 1,2-difluorobenzene | 4.9 | 85.0 | 0.35 | 74.1 | 131 |
| 52 | 1,2,3-trifluorobenzene | 5.2 | 84.5 | 0.37 | 73.8 | 131 |

TABLE 7-continued

| Battery No. | Type of fluorinated aromatic compound | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (° C.) |
|---|---|---|---|---|---|---|
| 53 | 1,2,3,4-tetrafluorobenzene | 5.5 | 83.9 | 0.40 | 73.3 | 131 |
| 54 | pentafluorobenzene | 5.7 | 82.2 | 0.44 | 72.7 | 131 |
| 55 | hexafluorobenzene | 6.0 | 80.6 | 0.56 | 72.0 | 131 |
| 56 | 2-fluorotoluene | 5.9 | 80.8 | 0.55 | 72.2 | 133 |
| 57 | trifluorotoluene | 6.1 | 80.3 | 0.58 | 72.0 | 135 |

All of the batteries had favorable cycle characteristics, low-temperature characteristics, and safety.

Example 7

By using the fatty acid alkyl ester as shown in Table 8 in place of FB as the low-viscosity solvent B, the weight ratio of the low-viscosity solvent B was set to 10 wt % to the total of the non-aqueous electrolyte.

Except for above, batteries were produced in the same manner as in Example 1 and evaluated.

Evaluation results are shown in Table 8.

TABLE 8

| Battery No. | Type of fatty acid alkyl ester | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (° C.) |
|---|---|---|---|---|---|---|
| 61 | Ethyl propionate | 4.7 | 83.5 | 0.46 | 75.8 | 135 |
| 62 | Methyl butyrate | 4.5 | 83.8 | 0.41 | 76.7 | 135 |
| 63 | Ethyl butyrate | 4.8 | 83.3 | 0.50 | 75.6 | 134 |
| 64 | Methyl pentanoate | 5.0 | 82.5 | 0.52 | 74.0 | 134 |
| 65 | Ethyl pentanoate | 5.1 | 82.0 | 0.55 | 73.3 | 134 |

All of the batteries had favorable cycle characteristics, low-temperature characteristics, and safety.

Example 8

As the non-aqueous solvent, a mixed solvent of EC, PC, DEC, and FB, to which a cyclic carbonate having a C=C unsaturated bond and a sultone compound were added as an additive C, was used. The mixing weight ratio of EC, PC, DEC, FB, and the additive C was set to 1:5:4:1:0.5. As the cyclic carbonate having a C=C unsaturated bond, vinylene carbonate (VC) was used. As the sultone compound, 1,3-propane sultone (PS) was used. A ratio $W_C/W_{SL}$: a weight ratio $W_C$ of the cyclic carbonate in the total of the non-aqueous electrolyte to a weight ratio $W_{SL}$ of the sultone compound in the total of the non-aqueous electrolyte, was changed to values as listed in Table 9.

Except for above, batteries were produced in the same manner as in Example 1 and were evaluated.

Evaluation results are shown in Table 9.

TABLE 9

| Battery No. | $W_C/W_{SL}$ | Viscosity of non-aqueous electrolyte (mPa·s) | Cycle capacity retention rate (%) | Battery expansion after cycle (mm) | Low-temperature discharge capacity retention rate (%) | Maximum value of temperature of battery surface (° C.) |
|---|---|---|---|---|---|---|
| 71 | 0.5 | 4.7 | 80.3 | 0.57 | 76.2 | 131 |
| 72 | 0.75 | 4.7 | 82.2 | 0.41 | 76.0 | 131 |
| 73 | 1 | 4.7 | 85.0 | 0.35 | 76.1 | 131 |
| 74 | 1.5 | 4.7 | 85.2 | 0.34 | 74.7 | 131 |
| 75 | 2 | 4.7 | 83.6 | 0.38 | 73.7 | 131 |
| 76 | 3 | 4.7 | 82.8 | 0.43 | 73.0 | 131 |
| 77 | 4 | 4.7 | 80.9 | 0.58 | 71.5 | 131 |

All of the batteries had favorable cycle characteristics, low-temperature characteristics, and safety. In particular, batteries 72 to 76 having the $W_C/W_{SL}$ of 0.75 to 3 had excellent characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

By using the non-aqueous electrolyte of the present invention, the effect of suppressing decrease in the charge and discharge capacity of the non-aqueous electrolyte secondary battery during storage at high temperatures and during the charge and discharge cycles can be achieved, together with excellent low-temperature characteristics. The non-aqueous electrolyte secondary battery of the present invention is useful in cellular phones, personal computers, digital still cameras, game machines, portable audio equipment, etc.

The invention claimed is:

1. A non-aqueous electrolyte including a non-aqueous solvent and
a solute dissolved in said non-aqueous solvent,
said non-aqueous solvent consisting of ethylene carbonate, propylene carbonate, diethyl carbonate, and an additive,
said additive being at least one of a fluorinated aromatic compound having a molecular weight of 90 to 200 and a fatty acid alkyl ester having a molecular weight of 80 to 240,
a weight ratio $W_{EC}$ of said ethylene carbonate being 5 to 30 wt % to the total of said nonaqueous electrolyte,
a weight ratio $W_{PC}$ of said propylene carbonate being 15 to 60 wt % to the total of said non-aqueous electrolyte,
a weight ratio $W_{DEC}$ of said diethyl carbonate being 10 to 50 wt % to the total of said nonaqueous electrolyte,
a weight ratio $W_{LV}$ of said additive being 5 to 35 wt % to the total of said non-aqueous electrolyte, and
said fluorinated aromatic compound being at least one selected from the group consisting of fluorobenzene, 1,2-difluorobenzene, 1,2,3-trifluorobenzene, 1,2,3,4-tetrafluorobenzene, pentafluorobenzene, and hexafluorobenzene.

2. The non-aqueous electrolyte in accordance with claim 1, wherein the weight ratio $W_{EC}$ of said ethylene carbonate is 10 to 15 wt % to the total of said non-aqueous electrolyte,
the weight ratio $W_{PC}$ of said propylene carbonate is 30 to 50 wt % to the total of said non-aqueous electrolyte, and
the weight ratio $W_{DEC}$ of said diethyl carbonate is 30 to 40 wt % to the total of said non-aqueous electrolyte.

3. The non-aqueous electrolyte in accordance with claim 1, wherein said fatty acid alkyl ester is a compound represented by the following formula (2):

[Chem. 2]

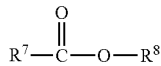

(2)

where $R^7$ and $R^8$ are independently an alkyl group having 1 to 5 carbons.

4. The non-aqueous electrolyte in accordance with claim 3, wherein said fatty acid alkyl ester is at least one selected form the group consisting of ethyl propionate, methyl butyrate, ethyl butyrate, methyl pentanoate, and ethyl pentanoate.

5. The non-aqueous electrolyte in accordance with claim 1, wherein said additive includes said fluorinated aromatic compound and said fatty acid alkyl ester,
a weight ratio $W_{FA}$ of said fluorinated aromatic compound is 5 to 15 wt % to the total of said non-aqueous electrolyte, and
a weight ratio $W_{ES}$ of said fatty acid alkyl ester is 5 to 25 wt % to the total of said non-aqueous electrolyte.

6. The non-aqueous electrolyte in accordance with claim 1, further including a cyclic carbonate having a C=C unsaturated bond and a sultone compound,
wherein the ratio $W_C/W_{SL}$: the weight ratio $W_C$ of said cyclic carbonate having a C=C unsaturated bond in the total of said non-aqueous electrolyte to the weight ratio $W_{SL}$ of said sultone compound in the total of said non-aqueous electrolyte is 0.75 to 3.

7. A non-aqueous electrolyte secondary battery including a positive electrode, a negative electrode, a separator disposed between said positive electrode and said negative electrode, and the non-aqueous electrolyte in accordance with claim 1.

* * * * *